United States Patent [19]

Yazaki et al.

[11] Patent Number: 4,713,282

[45] Date of Patent: Dec. 15, 1987

[54] FILMS FOR USE IN STRETCH-PACKAGING

[75] Inventors: Takao Yazaki; Masataka Noro; Takashi Matsui, all of Mie, Japan

[73] Assignee: Mitsubishi Petrochemical Co., Ltd., Tokyo, Japan

[21] Appl. No.: 878,959

[22] PCT Filed: Oct. 7, 1985

[86] PCT No.: PCT/JP85/00555

§ 371 Date: Jun. 6, 1986

§ 102(e) Date: Jun. 6, 1986

[87] PCT Pub. No.: WO86/02043

PCT Pub. Date: Apr. 10, 1986

[30] Foreign Application Priority Data

Oct. 8, 1984 [JP] Japan .................................. 59-211125

[51] Int. Cl.$^4$ ........................ B32B 27/28; B32B 27/32; B65D 65/40

[52] U.S. Cl. .................................. 428/216; 428/218; 428/516; 428/518; 428/520; 428/480; 264/176.1

[58] Field of Search ............... 428/516, 518, 520, 480, 428/216, 218

[56] References Cited

U.S. PATENT DOCUMENTS

| | | | |
|---|---|---|---|
| 3,741,253 | 6/1973 | Brax et al. ........................... | 428/520 |
| 3,882,259 | 6/1975 | Nohara et al. ....................... | 428/516 |
| 4,493,867 | 1/1985 | Yazaki et al. ....................... | 428/161 |
| 4,619,859 | 10/1986 | Yoshimura et al. ................. | 428/518 |

*Primary Examiner*—P. C. Ives
*Attorney, Agent, or Firm*—Oblon, Fisher, Spivak, McClelland, & Maier

[57] ABSTRACT

The present invention relates to a film for use in stretch-packaging that comprises an intermediate layer which contains as its main component an α-olefin-series resin component containing a butene-1-series resin and at least two surface layers each containing an ethylene-vinyl acetate copolymer resin as its main component, the surface layers being laminated over both surfaces of the intermediate layer. The film has remarkably high values of tear strength and recovery from deformation.

14 Claims, No Drawings

FILMS FOR USE IN STRETCH-PACKAGING

TECHNICAL FIELD

The present invention relates to a film for use in the stretch-packaging of foodstuffs.

BACKGROUND ART

In recent years, so-called pre-package wherein foodstuffs such as vegetables and fruits, fresh fishes, fresh meats and daily dishes with or without a plastic tray for carrying the foodstuffs are stretch-packaged with a film is common practice. Active research is continued to develop, as the film for use in the pre-package, films made of ethylene-series resins such as low-density polyethylene resins, ethylene-vinyl acetate copolymer resins, etc., in place of the conventional films made of poly(vinyl chloride), principally because of safety and hygienic reasons.

However, the films made of low-density polyethylene-series resins such as low-density polyethylene resins, ethylene-butene-1 copolymer resins, etc., which have already been known as films for use in stretch-packaging, are rigid and have low elongation. If the films are stretched with great force, the films will either tear or at most exhibit uneven elongation. In some cases, the tray carrying the foodstuff to be packaged will be deformed or collapse to produce wrinkles in the film and, as a result, such the troubles that the tightening force which is necessary for accomplishing the desired packaging is not attainable or the packaged foodstuff becomes unsaleable are caused.

The films made of ethylene-vinyl acetate copolymer resins are free from the aforementioned troubles of the films made of low-density polyethylene-series resins if factors such as the content of vinyl acetate, the melt flow rate, etc., are properly controlled. However, if the foodstuff to be packaged has sharp corners or if the corners of the tray carrying the foodstuff are sharp, the film made of ethylene-vinyl acetate copolymer resins will tear because of the sharp corners while it is stretched in an attempt to package the foodstuff. In addition, a small tear that may occur in the film if it contacts various objects which are encountered during the distribution of the stretch-packaged foodstuff will propagate either to produce a large tear or to cause the complete unpackaging of the foodstuff.

The troubles of rigidity and low elongation can also be eliminated by laminating the film of low-density polyethylene-series resin with the film of ethylene-vinyl acetate copolymer resin, but the other trouble which is associated with the tear which may occur during packaging operations and in the process of distribution will not be completely solved, particularly when the thickness of the laminated film is comparatively small.

With a view to eliminating the aforementioned troubles of the conventional films for use in the stretch-packaging of foodstuffs and in order to provide a thin film suitable for use in stretch-packaging that has appropriate degrees of lubricity and self-adhesion property and satisfactory levels of heat sealability and transparency and which yet exhibits high degrees of stretchability and flexibility, particularly high tear strength, the present inventors previously invented a film for use in stretch-packaging which comprises a layer that contains a specified propylene-α-olefin random copolymer resin as its main component and at least two layers each containing as its main component an ethylene-vinyl acetate copolymer resin with a vinyl acetate content ranging from 5 to 25 wt%, the latter layers being laminated over both surfaces of the former layer. (This invention was described in the specification of Japanese Patent Application No. 167566/84.)

This film, however, does not fully satisfy the following requirements of marketability concerning recovery properties from deformation: that the product of interest is tightly packaged with the film and the film provides good fit to the product's shape without producing any wrinkles; and that even if the film is deformed because of the contact with other objects while the packaged product is being transported or displayed at store or in showcases, the film is restored from the deformed state without producing any wrinkles.

DISCLOSURE OF THE INVENTION

The present invention has been accomplished in order to provide a film for use in the stretch-packaging of foodstuffs, having the improved recovery properties from deformation. The principal object, therefore, of the present invention is to provide a film that is highly adaptable to automatic stretch-packaging in that it has appropriate degrees of lubricity and self-adhesion property and satisfactory levels of heat sealability while retaining high heat resistance and transparency and in that it yet exhibits high degrees of stretchability and flexibility, as well as remarkably high levels of tear strength and recovery from deformation.

The film of the present invention which is intended for use in stretch-packaging comprises an intermediate layer that contains as its main component an α-olefin-series resin component containing a butene-1-series resin and at least two surface layers each containing as its main component an ethylene-vinyl acetate copolymer resin having a vinyl acetate content of 5 to 25 wt%, the surface layers being laminated over both surfaces of the intermediate layer.

It is essential that the resin component in the intermediate layer in the stretch-packaging film of the present invention should contain a butene-1-series resin.

The term "butene-1-series resin" as used herein includes both homo- and copolymers of butene-1 such as polybutene-1 and butene-1-ethylene copolymer with an ethylene content of 1.5 to 10 wt%, which are stereoregular and have high molecular weight. These butene-1-series resins preferably have densities ranging from 0.89 to 0.92 g/cm$^3$, particularly from 0.895 to 0.910 g/cm$^3$, and melt flow rates (hereinafter abbreviated as MFR) at 190° C. within the range of 0.1 to 10 g/10 min.

An α-olefin-series resin other than the butene-1-series resin is preferably compounded in the resin component of the intermediate layer containing the aforementioned butene-1-series resin for the purposes of controlling such factors as the film stretchability and flexibility and of allowing the film to be cut easily on a line of perforations. The α-olefin-series resin which may be compounded for these purposes is at least one member selected from the group consisting of a propylene-α-olefin random copolymer resin which is a random copolymer of propylene and at least one α-olefin selected from among ethylene and the α-olefins having 4 to 8 carbon atoms such as butene-1, hexene-1, 4-methylpentene-1, octene-1, etc., and which has an α-olefin content of 4 to 19 wt%, a density not higher than 0.900 g/cm$^3$ and a MFR of 1 to 10 g/10 min. at 230° C.; an ethylene-α-olefin copolymer resin which is a copolymer of ethylene and at least one α-olefin selected from among the α-olefins having 3 to 8 carbon atoms such as propylene, butene-1, hexene-1, 4-methylpentene-1, octene-1, etc., and which has an α-olefin content of 6 to 16 wt% and a MFR of 0.1 to 5 g/10 min. at 190° C.; and an ethylene-vinyl acetate copolymer resin having a vinyl acetate content of 5 to 25 wt%. These α-olefin-series resins may be compounded in amounts ranging from 10 to 90 wt% of the combination with the butene-1-series resin, and it is preferable that the resin component in the intermediate layer consists of 50 to 85 wt% of the butene-1-series resin and 50 to 15 wt% of the α-olefin-series resin other than the butene-1-series resin. It is particularly preferable to use a propylene-ethylene-butene-1 copolymer resin in combination with an ethylene-vinyl acetate copolymer resin.

In addition to these resin components, a rubber made of an ethylene-propylene copolymer, ethylene-butene-1 copolymer, etc., and additives to be described later may be optionally compounded in the intermediate layer for the purpose of controlling such factors as stretchability, flexibility, etc.

The reasons that the intermediate layer in the film of the present invention contains the butene-1-series resin as its main component are as follows. If a conventional ethylene-α-olefin copolymer resin is used instead of the butene-1-series resin, the resulting film having layers of an ethylene-vinyl acetate copolymer resin on both surfaces has such low levels of tear strength and recovery from deformation that it is not suitable for use in stretch-packaging. If a conventional propylene-α-olefin random copolymer resn is used instead of the butene-1-series resin, the resulting laminated film is relatively low in stretchability and flexibility and is unable to exhibit adequate recovery from deformation.

The intermediate layer which contains as its main component an α-olefin-series resin component containing the aforementioned butene-1-series resin is sandwiched between layers of an ethylene-vinyl acetate copolymer resin which may be selected from among the resins that are commonly employed in stretch-packaging films. The vinyl acetate content of this resin ranges from 5 to 25 wt%, preferably from 10 to 20 wt%, and the MFR of the resin generally ranges from 0.3 to 5 g/10 min., preferably from 1 to 3 g/10 min., at 190° C.

If the vinyl acetate content of the ethylene-vinyl acetate copolymer resin is less than 5 wt%, the resulting laminated film has insufficient stretchability and flexibility and does not have adequate self-adhesion property. If the vinyl acetate content exceeds 25 wt%, the laminated film has insufficient strength and does not provide an appropriate degree of lubricity. If the MFR at 190° C. of the ethylene-vinyl acetate copolymer resin is less than 0.3 g/10 min., the laminated film has low elongation. If the MFR at 190° C. exceeds 5 g/10 min., the film has small breaking strength. In other words, sufficient film stretchability is not attained if the MFR at 190° C. is less than 0.3 g/10 min. or more than 5 g/10 min.

An aliphatic alcohol-series fatty acid ester compound made by reacting an aliphatic alcohol having 1 to 12 carbon atoms, preferably 1 to 6 carbon atoms, with a fatty acid having 10 to 22 carbon atoms, preferably 12 to 18 carbon atoms may be added in the intermediate layer and the surface layers in order to provide them with appropriate degrees of lubricity and self-adhesion property, as well as anti-fogging and antistatic properties. Specific examples of such esters include: monoglycerin oleate, polyglycerin oleate, glycerin triricinoleate, glycerin acetyl ricinoleate, methylacetyl ricinoleate, ethylacetyl ricinoleate, butylacetyl ricinoleate, propylene glycol oleate, propylene glycol laurate, pentaerythritol oleate, polyethylene glycol oleate, polypropylene glycol oleate, polyoxyethylene glycerin, polyoxypropylene glycerin, sorbitan oleate, sorbitan laurate, polyethylene glycol sorbitan oleate, polyethylene glycol sorbitan laurate, etc. A polyalkylene ether polyol such as polyethylene glycol, polypropylene glycol, etc., may be added in the intermediate layer and the surface layers. At least one of these esters and polyalkylene ether polyols may be added in an amount ranging from 0.5 to 5 wt%, preferably from 1 to 3 wt%.

The reasons that in accordance with the present invention, the intermediate layer which contains as its main component an α-olefin-series resin component containing the aforementioned butene-1-series resin must be sandwiched between the surface layers each containing the aforementioned ethylene-vinyl acetate copolymer resin as its main component are as follows. A film solely made of the layer of an α-olefin-series resin containing the butene-1-series resin does not have the desired degrees of stretchability and flexibility. On the other hand, a film solely made of the layer of an ethylene-vinyl acetate copolymer resin has insufficient tear strength.

The stretch-packaging film of the present invention may be formed from the aforementioned two resin components by kneading the respective resin component in the separate extruder and laminating the compositions according to any of the known techniques such as coextrusion, extrusion laminating, etc., using the inflation molding or T-die molding. A film wherein the mechanical strength (e.g., tear strength) in machine direction is in balance with the strength in transversal direction is preferably fabricated by coextrusion using the inflation molding, with the blow ratio being preferably selected from the range of 3 to 7.

The film of the present invention has a thickness within the range of 8 to 30 μm, with the intermediate layer having a thickness of 2 to 10 μm and each of the surface layers being 3 to 10 μm thick.

Because of the butene-1-series resin present in the intermediate layer, the stretch-packaging film of the present invention exhibits satisfactory degrees of stretchability and flexibility, retains high heat resistance upon heat sealing, and displays particularly high levels of tear strength and recovery from deformation. In addition, the layer of ethylene-vinyl acetate copolymer resin with a vinyl acetate content of 5 to 25 wt% having satisfactory degrees of stretchability and flexibility which is laminated over both surfaces of the intermediate layer serves to provide the film not only with appropriate degrees of lubricity and self-adhesion property but also with satisfactory heat sealability.

BEST MODE FOR CARRYING OUT THE INVENTION

Example 1

A resin composition consisting of 70 wt% of polybutene-1 (density, 0.915 g/cm$^3$; MFR at 190° C., 1.8 g/10 min. (MO200 of Shell Chemical Co.)); 15 wt% of propylene-ethylene-butene-1 random copolymer resin (ethylene content, 2.0 wt%; butene-1 content, 13.0 wt%; density, 0.896 g/cm$^3$; MFR at 230° C., 5.0 g/10 min.), and 15 wt% of ethylene-vinyl acetate copolymer resin (vinyl acetate content, 15 wt%; MFR at 190° C., 2.0 g/10 min.) was kneaded in an extruder (barrel dia., 65 mm; L/D ratio, 25) at 185° C. A resin composition consisting of 98.5 wt% of ethylene-vinyl acetate copolymer resin (vinyl acetate content, 15 wt%; MFR at 190° C., 2.0 g/10 min.) and 1.5 wt% of monoglycerin oleate (Rikemal OL 100 of Riken Vitamin Oil Co., Ltd.) was kneaded in an extruder (barrel dia., 50 mm; L/D ratio, 25) at 160° C. The two blends were fed into a single unit of annular three-layer forming die and subjected to inflation molding (die temperature, 185° C.; blow ratio, 5.0) in such a manner that a surface layer 4 μm thick which contained the ethylene-vinyl acetate copolymer resin as its main component was laminated on both surfaces of an intermediate layer 5 μm thick which contained the polybutene-1 containing resin component as its main component. A film having a total thickness of 13 μm which was suitable for use in stretch-packaging was obtained.

Meat, fish and vegetable were placed on trays of foamed polystyrene, stretched polystyrene and impact-resistant polystyrene, respectively, and were packaged with the film using an automatically stretch-packaging machine, Model A18X of Fuji Pack System Co. The properties of the film and the results of packaging with it are shown in the table.

Example 2

A stretch-packaging film was fabricated as in Example 1 except that polybutene-1 was replaced by M8640 of Shell Chemical Co. having a density of 0.908 g/cm$^3$ and a MFR of 1.0 g/10 min. at 190° C. The properties of the film and the results of stretch-packaging with it are shown in the table.

Example 3

A stretch-packaging film was fabricated as in Example 1 except that an intermediate layer was formed of a resin composition consisting of 70 wt% of polybutene-1 which was of the same type as used in Example 1, 15 wt% of a propylene-ethylene random copolymer resin (ethylene content; 5.5 wt%, MFR, 2.2 g/10 min. at 230° C.), and 15 wt% of an ethylene-vinyl acetate copolymer resin of the same type as used in Example 1. The properties of the film and the results of stretch-packaging with it are shown in the table.

Example 4

A stretch-packaging film was fabricated as in Example 1 except that an intermediate layer was formed of a resin composition consisting of 51 wt% of polybutene-1, 20 wt% of propylene-ethylene-butene-1 random copolymer resin, and 29 wt% of ethylene-vinyl acetate copolymer resin, all resin components being of the same type as used in Example 2. The properties of the film and the results of stretch-packaging with it are shown in the table.

Example 5

A stretch-packaging film was fabricated as in Example 1 except that an intermediate layer was formed of a resin composition consisting of 60 wt% of polybutene-1 of the same type as used in Example 2, 10 wt% of butene-1-ethylene copolymer resin (M 8010 of Shell Chemical Co.; ethylene content, 3.0 wt%; density, 0.895 g/cm$^3$; MFR, 0.2 g/10 min. at 190° C.), and 15 wt% each of propylene-ethylene-butene-1 random copolymer resin and ethylene-vinyl acetate copolymer resin which were of the same types as used in Example 2. The properties of the film and the results of stretch-packaging with it are shown in the table.

Example 6

A stretch-packaging film was fabricated as in Example 1 except that an intermediate layer was formed of a resin composition consisting of 42 wt% of polybutene-1 and 50 wt% of propylene-ethylene-butene-1 random copolymer resin, each being of the same type as used in Example 2, as well as 5 wt% of ethylene-butene-1 copolymer resin (butene-1 content, 9.0 wt%, MFR, 2.0 g/10 min. at 190° C.), and 3 wt% of monoglycerin oleate. The properties of the film and the results of stretch-packaging with it are shown in the table.

Example 7

A stretch-packaging film was fabricated as in Example 1 except that an intermediate layer was formed of a resin composition consisting of 20 wt% of polybutene-1, 70 wt% of propylene-ethylene-butene-1 random copolymer resin, 8 wt% of ethylene-vinyl acetate copolymer resin, and 2 wt% of monoglycerin oleate, each resin component being of the same type as used in Example 2. The properties of the film and the results of stretch-packaging with it are shown in the table.

Example 8

A stretch-packaging film was fabricated as in Example 1 except that the intermediate layer had a thickness of 3 μm while each of the surface layers was 5 μm thick. The properties of the film and the results of stretch-packaging with it are shown in the table.

Comparative Example 1

A stretch-packaging film was fabricated as in Example 1 except that the intermediate layer was solely made of an ethylene-butene-1 copolymer resin of the same type as used in Example 6. The properties of the film and the results of stretch-packaging with it are shown in the table.

Comparative Example 2

A stretch-packaging film was fabricated as in Example 1 except that the intermediate layer was solely made of a propylene-ethylene-butene-1 random copolymer resin which was of the same type as used in Example 1. The properties of the film and the results of stretch-packaging with it are shown in the table.

TABLE

| | Properties of Film | | | | | | | | | Apptitude for Packaging | | |
|---|---|---|---|---|---|---|---|---|---|---|---|---|
| | Tensile Elastic Modulus (kg/cm²) | | Tensile Breaking Strength (kg/cm²) | | Tensile Elongation at Break (%) | | Tear Strength in Elmendorf Test (kg/cm) | | Permanent Elongation after 100% Stretching (%) | | | |
| Run No. | MD* | TD** | MD | TD | MD | TD | MD | TD | MD | TD | Tensile Stretchability | Tear Formation | Wrinkle Formation |
| Example 1 | 930 | 1250 | 430 | 380 | 220 | 490 | 120 | 80 | 14 | 11 | good | no tear | no wrinkle |
| Example 2 | 1020 | 1490 | 410 | 390 | 230 | 500 | 190 | 85 | 14 | 12 | " | " | " |
| Example 3 | 900 | 1220 | 410 | 340 | 200 | 470 | 95 | 70 | 17 | 15 | " | " | " |
| Example 4 | 860 | 1120 | 350 | 340 | 210 | 460 | 90 | 69 | 15 | 13 | " | " | " |
| Example 5 | 930 | 1200 | 420 | 380 | 200 | 480 | 190 | 77 | 14 | 12 | " | " | " |
| Example 6 | 1650 | 1520 | 360 | 310 | 280 | 530 | 85 | 95 | 19 | 17 | " | " | very few wrinkles |
| Example 7 | 1850 | 1700 | 340 | 310 | 320 | 500 | 40 | 140 | 24 | 20 | " | " | local fine wrinkles |
| Example 8 | 850 | 930 | 350 | 300 | 240 | 470 | 90 | 66 | 10 | 9 | " | " | no wrinkle |
| Comparative Example 1 | 1200 | 1200 | 270 | 320 | 400 | 610 | 55 | 58 | 30 | 25 | " | occasional tear | positive |
| Comparative Example 2 | 2100 | 2400 | 360 | 290 | 350 | 540 | 30 | 180 | 36 | 31 | rigid, hard to stretch, unevenly stretched | no tear | some wrinkles |

MD*: Machine direction
TD**: Transversal direction

The values of "permanent elongation" indicated in the table were measured by the following procedures: a test piece having a width of 10 mm and a gage length of 50 mm was stretched by 100% at a rate of 200 mm/min. and held in the stretched state for 1 minute; the load was removed and the permanent elongation remaining 5 minutes later was measured.

INDUSTRIAL APPLICABILITY

The film for use in stretch-packaging of the present invention have properties that meet all of the requirements for use in stretch-packaging. In addition, the film exhibits remarkably high value of tear strength and recovery from deformation and, hence, will find utility in prepackage applications.

What is claimed is:

1. A film for use in stretch-packaging, which comprises: an intermediate layer that has as its main component an α-olefin-series resin component containing a butene-1-series resin and at least two surface layers each containing as its main component an ethylene-vinyl acetate copolymer resin with a vinyl acetate content of 5 to 25 wt%, the surface layers being laminated over both surfaces of the intermediate layer.

2. The stretch-packaging film according to claim 1, wherein the α-olefin-series resin component in the intermediate layer consists of 10 to 90 wt% of the butene-1-series resin and 90 to 10 wt% of other α-olefin-series copolymer resin.

3. The stretch-packaging film according to claim 1, wherein the α-olefin-series resin component in the intermediate layer consists of 50 to 85 wt% of the butene-1-series resin and 50 to 15 wt% of other α-olefin-series copolymer resin.

4. The stretch-packaging film according to claim 2 or 3, wherein said other α-olefin-series copolymer resin is a propylene-α-olefin random copolymer resin which is a copolymer of propylene and at least one α-olefin selected from among ethylene and the α-olefins having 4 to 8 carbon atoms, the content of said α-olefin being in the range of 4 to 19 wt%.

5. The stretch-packaging film according to claim 2 or 3, wherein said other α-olefin-series copolymer resin is an ethylene-α-olefin copolymer resin which is a copolymer of ethylene and at least one α-olefin selected from among the α-olefins having 3 to 8 carbon atoms, the content of said α-olefin being in the range of 6 to 16 wt%.

6. The stretch-packaging film according to claim 2 or 3, wherein said other α-olefin-series copolymer resin is a mixture of a propylene-α-olefin random copolymer resin and an ethylene-vinyl acetate copolymer resin with a vinyl acetate content of 5 to 25 wt%, said random copolymer resin being a copolymer of propylene and at least one α-olefin selected from among ethylene and the α-olefins having 4 to 8 carbon atoms, the content of said α-olefin being 4 to 19 wt%.

7. The stretch-packaging film according to claim 2 or 3, wherein said other α-olefin-series copolymer resin is a mixture of an ethylene-α-olefin copolymer resin and an ethylene-vinyl acetate copolymer resin with a vinyl acetate content of 5 to 25 wt%, said ethylene-α-olefin copolymer resin being a copolymer of ethylene and at least one α-olefin selected from among the α-olefins having 3 to 8 carbon atoms, the content of said α-olefin being 6 to 16 wt%.

8. The stretch-packaging film according to claim 1, wherein said intermediate layer and each of said surface layers contains 0.5 to 5 wt% of an aliphatic alcohol-series fatty acid ester compound which is the reaction product of an aliphatic alcohol having 1 to 12 carbon atoms and a fatty acid having 10 to 22 carbon atoms.

9. The stretch-packaging film according to claim 1, wherein the film product has a thickness within the range of 8–30 μm, the intermediate layer of said film ranges in thickness from 2–10 μm, and each of the surface layers of the film range in thickness from 3–10 μm.

10. The stretch-packaging film according to claim 1, wherein said butene-1-series resin has a density ranging from 0.89 to 0.92 g/cm³ and a melt flow rate at 190° C. within the range of 0.1 to 10 g/10 min.

11. The stretch-packaging film according to claim 10, wherein said butene-1-series resin has a density ranging from 0.895 to 0.910 g/cm³.

12. The stretch-packaging film according to claim 1, wherein said ethylene-vinyl acetate copolymer resin has a vinyl acetate content ranging from 10–20 wt.%

13. The stretch-packaging film according to claim 1, wherein said ethylene-vinyl acetate copolymer resin has an MFR ranging from 0.3–5 g/10 min at 190° C.

14. The stretch-packaging film according to claim 1, wherein said MFR value ranges from 1–3 g/10 min.

* * * * *